T. M. TORSON.
AUTOMOBILE WHEEL PULLEY ATTACHMENT.
APPLICATION FILED FEB. 25, 1914.
1,142,737.
Patented June 8, 1915.
2 SHEETS—SHEET 1.
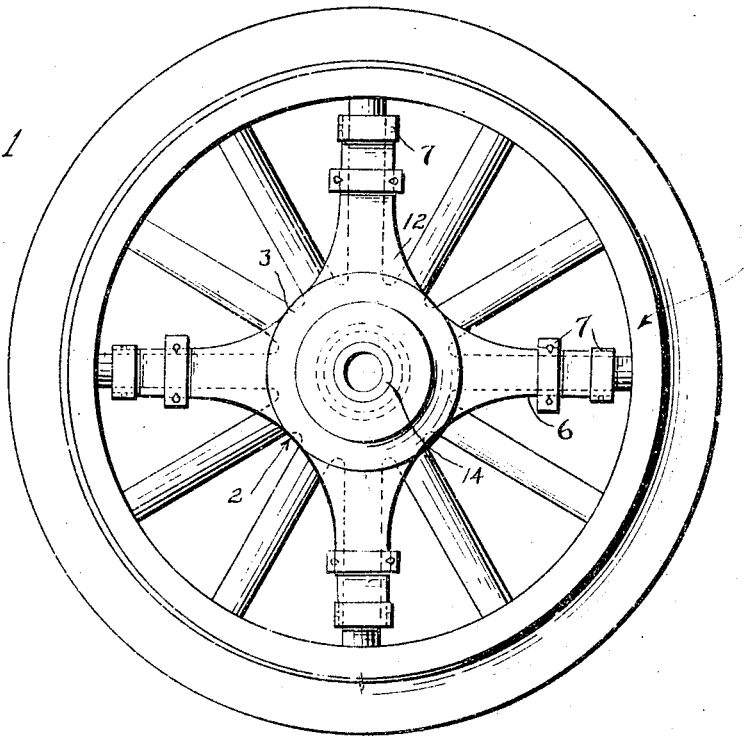
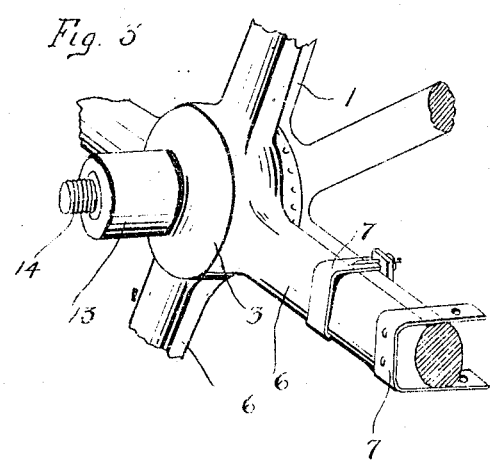

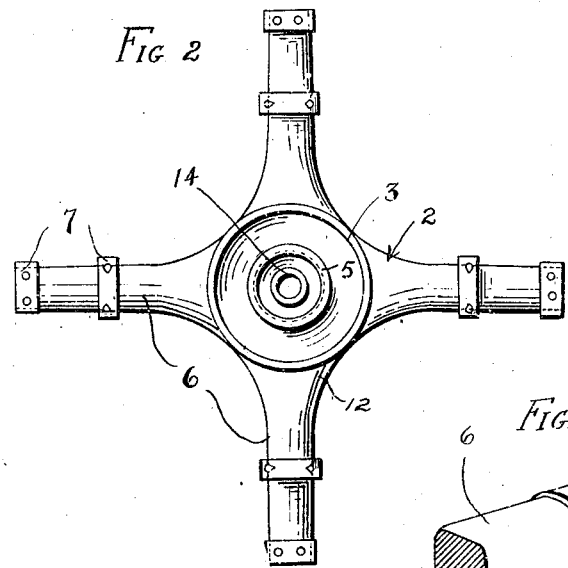
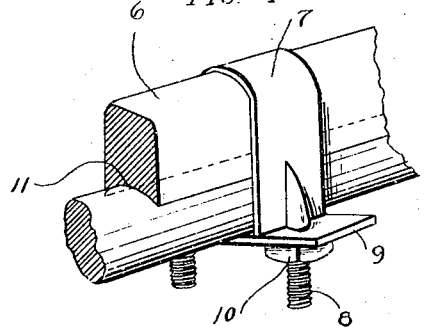
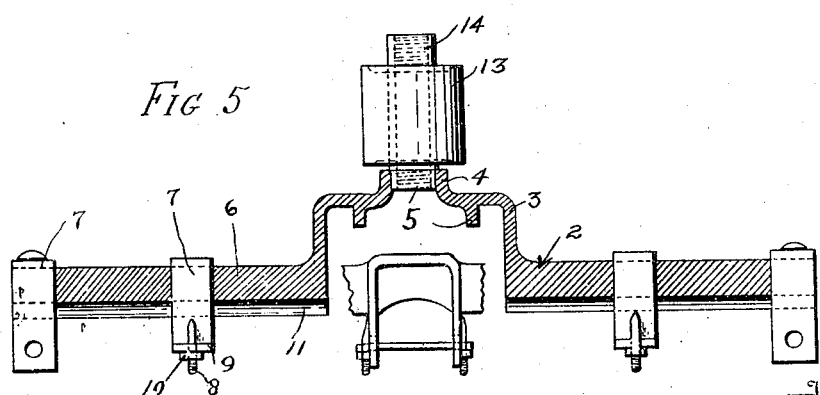

UNITED STATES PATENT OFFICE.

THOMAS M. TORSON, OF KANSAS CITY, KANSAS.

AUTOMOBILE-WHEEL PULLEY ATTACHMENT.

1,142,737.  Specification of Letters Patent.  Patented June 8, 1915.

Application filed February 25, 1914. Serial No. 820,918.

*To all whom it may concern:*

Be it known that I, THOMAS M. TORSON, a citizen of the United States, residing at Kansas City, in the county of Wyandotte and State of Kansas, have invented certain new and useful Improvements in Automobile - Wheel Pulley Attachments; and I do hereby declare the following to be a full, clear, and exact description of the invention, such as will enable others skilled in the art to which it appertains to make and use the same.

My invention relates to a simple and inexpensive pulley attachment for automobile wheels and resides in the provision of a device of the character described which is adapted to be attached to one of the rear wheels of an automobile so that power may be transmitted to various types of machines.

An important object of my invention is to provide an attachment of the character described which will render an automobile particularly useful about farms in furnishing power to different kinds of farm machinery and consists of a pulley that is operatively connected with novel means for attachment with one of the rear wheels of an automobile.

Another important object of my invention is to provide a simple and inexpensive device of the character described which may be readily attached and detached without requiring much time or labor.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a side elevation showing my attachment attached to the rear wheel of an automobile, Fig. 2 is a rear elevation of my attachment removed from the automobile, Fig. 3 is a fragmentary perspective view of a portion of an automobile wheel showing my attachment attached to the spokes of the wheel, Fig. 4 is a detail perspective view showing more clearly the detail clamping means for securing the attachment to the spokes of the wheel, and Fig. 5 is a horizontal sectional view taken through the center of the attachment.

Referring to the drawings by characters of reference, the numeral 1 designates as an entirety one of the rear or driving wheels of an automobile not shown.

My attachment comprises a frame designated 2 as an entirety. This frame 2 consists of a cup-shaped body portion 3 which is designed to fit snugly about the hub cap of an automobile wheel and is provided with an internally screw threaded nipple 4. The cup-shaped body portion 3 is provided interiorly thereof with the circular flange 5 which in combination with the wall of the cup-shaped body portion 3 provides for the snug and secure fitting of the body portion upon the hub portion of the wheel. The flange 5 fits about the hub cap itself while the body portion 3 incloses the hub plate of the wheel.

Formed integral with the body portion 3 are a plurality of radially extending securing arms 6. These arms 6 are adapted to engage and be clamped upon the spokes of the wheel. As a means for clamping the arms 6 to the spokes of the wheel I provide upon each arm a pair of U-shaped clamping members 7 that are arranged intermediate the ends of the arms 6. One of the clamping members 7 of each pair is arranged at the outer end of the arm and the other disposed at a point approximately centrally or any desirable point intermediate the ends of the arm. The clamps 7 are provided with reduced screw threaded extremities 8 upon which are mounted clamping plates 9 that are approximately rectangular in shape and held in clamping position by nuts 10 turned upon the screw threaded extremities 8 of the clamps 7. The outermost clamping members 7 are bolted to the ends of the arms 6 centrally of their ends and are apertured at their free ends to receive bolts. The arms of the outermost clamps fit upon opposite sides of the spokes. The spoke engaging faces of the arms 6 are longitudinally concaved as at 11 to conform to the shape of the spokes and fit snugly in engagement therewith. The arms 6 are enlarged at the point of their formation with the body portion 3 as at 12 so as to provide rigidity and strength. The arms 6 are formed preferably at the inner edge of the body portion 3. The internally screw threaded nipple 4 is disposed centrally of the closed end of the cup-shaped body portion 3 and extends outwardly at right angles therefrom. It will be readily seen that the frame 2 consisting of the body portion 3, parts thereon and arms 6 may be cast in one piece thus enabling a low cost of manufacture.

A pulley 13 that is fixed upon a tubular externally screw threaded shaft 14 is operatively connected with the body portion 3. The ends of the shaft 14 are screw threaded as before stated and are positioned in extended relation to the sides of the pulley. One screw threaded end of the shaft 14 is turned into the internally screw threaded nipple 4 in such a way that when the wheel of the automobile is rotated the pulley will not become unscrewed.

In operation the device is attached as described to one of the drive wheels of the automobile and the automobile is lifted from the ground at the rear thereof and supported in any suitable manner. When the motor of the automobile is started and the power transmitted to the wheel to which the device is attached and the other wheel is held from rotation the pulley will be rotated and may be connected by any suitable means with various types of machines. It will be noted that my attachment will render varied use of the power derived and that an automobile equipped with my attachment, particularly on farms will be rendered extremely useful in connection with operating various machines.

It will be seen with reference to the foregoing description and accompanying drawings that I have provided a simple and inexpensive attachment for automobiles which will operate in a reliable and expeditious manner to transmit power from the automobile to various types of machines.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. A device of the class described including an automobile wheel attachment comprising a cup-shape body portion arranged to fit about the outer hub plate of a wheel, an internal circular flange providing a snug and secure fitting of the body upon the hub portion of the wheel, an internally screw threaded nipple, a tubular externally screw threaded shaft adapted to be screwed into said nipple, a pulley fixed upon said shaft and operatively arranged to tighten said shaft in said screw threaded nipple upon turning of the wheel.

2. An automobile wheel attachment comprising a cup-shape body portion, a screw threaded nipple, an externally screw threaded shaft, a plurality of radial arms formed integral with said body portion, a plurality of clamping members carried by said arms, said arms having their spoke engaging faces concaved and tapering from the cup-shape portion to the outermost clamping member so as to lend rigidity and strength to said arms.

In testimony whereof I affix my signature in presence of two witnesses.

THOMAS M. TORSON.

Witnesses:
E. L. MARTIN,
HELEN KELLOGG.